United States Patent [19]

Block

[11] Patent Number: 4,506,774
[45] Date of Patent: Mar. 26, 1985

[54] SPRINGLESS SELF-ALIGNING CLUTCH RELEASE BEARING ASSEMBLY

[75] Inventor: Dennis A. Block, Northville, Mich.

[73] Assignee: Federal-Mogul Corporation, Southfield, Mich.

[21] Appl. No.: 321,010

[22] Filed: Nov. 13, 1981

[51] Int. Cl.³ ............................................. F16D 23/14
[52] U.S. Cl. .................................... 192/98; 192/110 B
[58] Field of Search .............. 192/98, 110 B; 308/232, 308/233, 236

[56] References Cited

U.S. PATENT DOCUMENTS

| 1,611,129 | 11/1921 | Janette . | |
|---|---|---|---|
| 1,645,982 | 11/1926 | Bishop . | |
| 1,935,546 | 11/1933 | Dieter . | |
| 1,943,167 | 4/1933 | Dieter .................................. | 308/41 |
| 2,235,431 | 3/1941 | Katcher .............................. | 308/233 |
| 2,241,032 | 5/1941 | Horrocks . | |
| 2,380,327 | 7/1945 | Parsons .............................. | 308/187 |
| 2,403,460 | 7/1946 | Rozner . | |
| 2,549,817 | 4/1951 | Johnson, Sr. ...................... | 308/233 |
| 3,390,927 | 7/1968 | Adams ................................ | 308/135 |
| 3,416,637 | 12/1968 | Maurice .............................. | 192/98 |
| 3,525,557 | 4/1968 | Willing ............................... | 308/233 |
| 3,604,545 | 9/1971 | Bourgeois .......................... | 192/98 |
| 3,674,357 | 7/1972 | Ladin et al. ........................ | 308/233 |
| 3,815,715 | 6/1974 | Maucher ............................. | 192/98 |
| 3,870,384 | 3/1975 | Ladin ................................. | 308/187.2 |
| 3,900,091 | 8/1975 | Maucher ............................. | 192/98 |
| 3,921,775 | 11/1975 | Matyschik .......................... | 308/233 |
| 3,931,875 | 1/1976 | Ladin ................................. | 192/98 |
| 3,948,371 | 4/1976 | Lonne ................................ | 192/98 |
| 3,967,710 | 7/1976 | Ernst et al. ......................... | 192/98 |
| 4,026,398 | 5/1977 | Matyschik et al. ................. | 192/98 |
| 4,033,440 | 7/1977 | Ladin ................................. | 192/98 |
| 4,219,246 | 8/1980 | Ladin ................................. | 192/98 |
| 4,228,881 | 10/1980 | Nakamura .......................... | 192/98 |
| 4,229,058 | 10/1980 | Arrowsmith et al. .............. | 308/184 |

FOREIGN PATENT DOCUMENTS

| 2533560 | 10/1977 | Fed. Rep. of Germany . | |
|---|---|---|---|
| 1387978 | 12/1964 | France . | |
| 2255505 | 7/1975 | France ............................... | 308/233 |
| 1405562 | 9/1975 | United Kingdom . | |
| 2068497 | 8/1981 | United Kingdom ................ | 192/98 |

Primary Examiner—Rodney H. Bonck
Attorney, Agent, or Firm—Robert F. Hess

[57] ABSTRACT

A self-aligning clutch release bearing assembly is described, which is particularly well suited for use in a rotatable friction clutch of the type where the clutch release levers constantly engage the rotatable race member of the bearing. A resilient retainer sleeve is interposed between a bearing and a tubular bearing carrier, and the bearing is constructed to provide a predetermined radial clearance between an inner race member of the bearing and the retainer sleeve. The retainer sleeve serves to hold the bearing in an assembled relationship with the bearing carrier, as well as to prevent the rotation of the inner race member with respect to the bearing carrier. The predetermined radial clearance permits the bearing to shift radially with respect to the bearing carrier, such that the bearing axis can be aligned with a clutch input axis under a dynamic force exerted by the rotating clutch release levers on the bearing.

10 Claims, 6 Drawing Figures

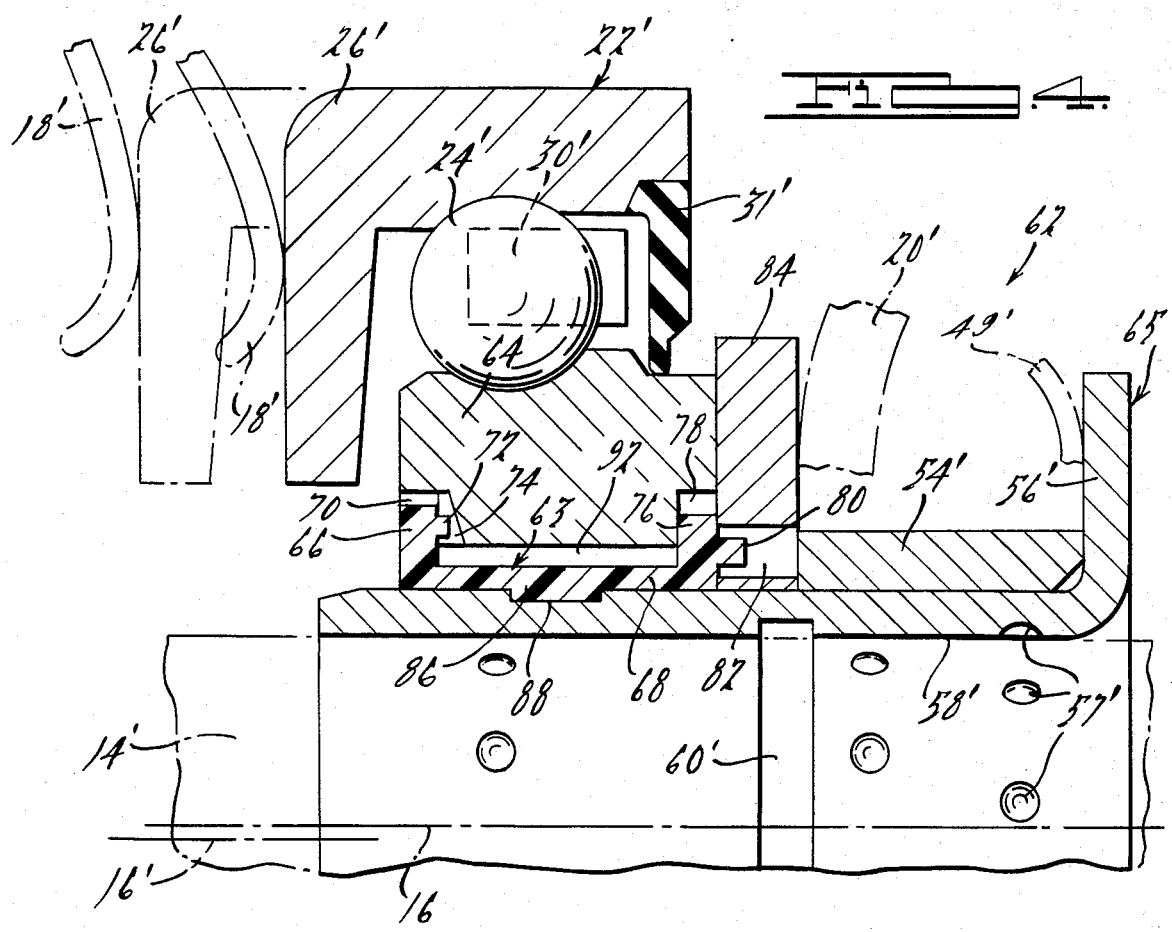
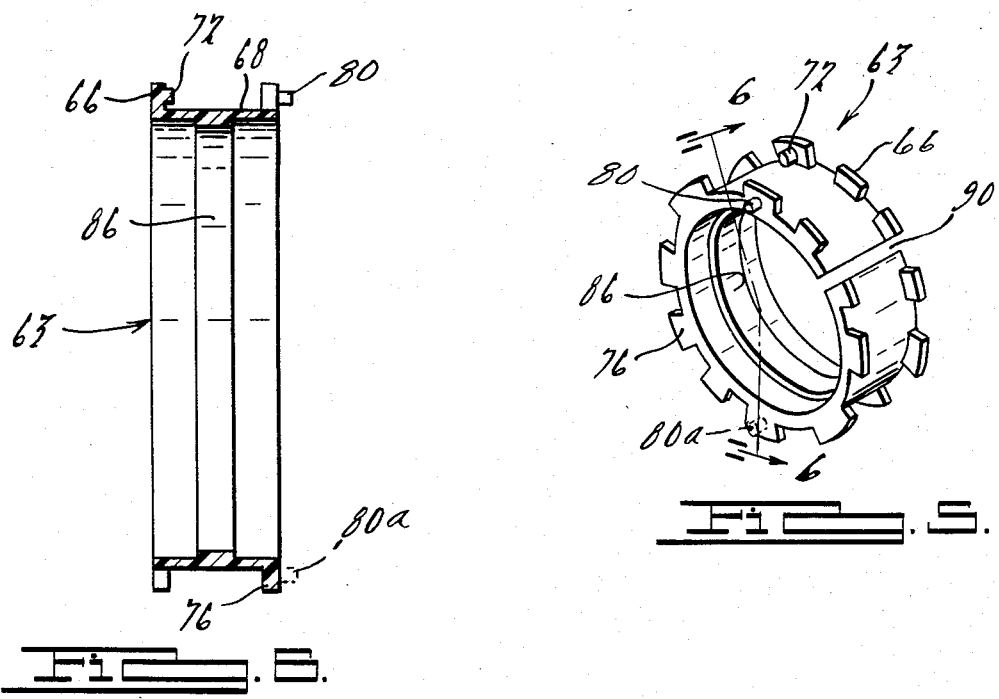

SPRINGLESS SELF-ALIGNING CLUTCH RELEASE BEARING ASSEMBLY

BACKGROUND AND SUMMARY OF THE INVENTION

The present invention relates generally to bearing assemblies, and particularly to self-aligning clutch release bearing assemblies in automobile friction disc clutches.

A common problem in typical automobile friction disc clutches arises from a misalignment or eccentricity between the engine crankshaft or clutch input shaft axis and the transmission shaft axis. With clutch release bearings having a fixed axis of rotation, this eccentricity subjects the clutch release bearing to chafing and vibration when engaged by the clutch release levers to actuate, i.e. disengage, the clutch. It has been common for the release bearing to be engaged only during clutch actuation by the vehicle operator. However, in some applications it has been found desirable to have the bearing engaged continuously and hence to be lightly or more forcefully engaged with the clutch release levers depending upon whether the clutch is actuated or not. In this situation the problems of chafing, etc., due to eccentricity are even more aggravated since the rotatable race member of the clutch release bearing will be in continuous rotating engagement with the clutch release levers whenever the engine is running.

The present invention provides a novel clutch release bearing assembly which is self-aligning and has special utility with the constantly engaged clutch bearing design. With prior self-aligning bearings, some type of retaining spring or mechanical retaining structure is used to hold the bearing in the aligned position when the clutch is engaged. In the present invention, no such device is used, and if the bearing were disengaged from the clutch release levers, it would move out of the aligned position. The present invention, however, converts the otherwise undesirable effects of the constantly engaged clutch bearing design into a valuable asset for aligning and maintaining alignment of the clutch release bearing with the input shaft axis of the clutch without the need for a retaining spring or mechanical structure. Accordingly, it is an object of the present invention to provide a self-aligning clutch release bearing for use with a constantly engaged clutch bearing design, which is of simple design, durable in operation, and which is of economical manufacture. With prior self-aligning bearing assemblies, the retaining spring inhibits rotation of the bearing assembly. In the present invention, where a retaining spring is not utilized, a simple sleeve with an interlocking tab and slot structure is used to prevent rotation and at the same time to provide a means for holding the components of the self-aligning bearing assembly in an assembled relationship. Thus, it is another object of the present invention to provide a novel self-aligning bearing assembly having a unique anti-rotation construction.

In accordance with the present invention, a resilient retainer sleeve is interposed between the bearing and a tubular bearing carrier, and the bearing is constructed to provide a predetermined annular radial clearance between an inner race member of the bearing and the retainer sleeve. The retainer sleeve serves to hold the bearing in an assembled relationship with the bearing carrier, as well as to prevent the rotation of the inner race member with respect to the bearing carrier. The predetermined radial clearance permits the bearing to shift radially with respect to the bearing carrier, such that the bearing axis can be aligned with the input shaft axis. This radial shifting movement occurs automatically since the radial chafing force exerted by the rotating clutch release levers will force the bearing to shift radially and assume the axis of the input (flywheel) of the clutch. It will be appreciated that a number of transient forces may act upon the bearing assembly to cause temporary misalignments. Accordingly, the alignment of the bearing axis with the clutch input axis will typically not be static, but rather dynamic in character. However, as long as the clutch release levers are rotating, the constant engagement of these levers with the bearing will continuously provide the force required to dynamically maintain the bearing in alignment with the clutch input axis. Another advantage of the resilient retainer member is that it serves to reduce noise which may result from the radial shifting movement of the bearing with respect to the bearing carrier.

Additional features and advantages of the invention will become apparent in view of the drawings and the following detailed description of the preferred embodiment.

BRIEF DESCRIPTION OF THE DRAWINGS

FIG. 4 is a fragmentary cross-sectional view of a self-aligning clutch release bearing assembly according to another embodiment of the present invention shown in a relationship with the clutch engaged and shown partially in phantom with the clutch disengaged.

FIG. 5 is a perspective view of the retainer sleeve provided in the bearing assembly of FIG. 4.

FIG. 6 is a cross-sectional view of the retainer sleeve shown in FIG. 5, the section being taken along lines 6—6 thereof.

DESCRIPTION OF THE PREFERRED EMBODIMENT

Figure 1:
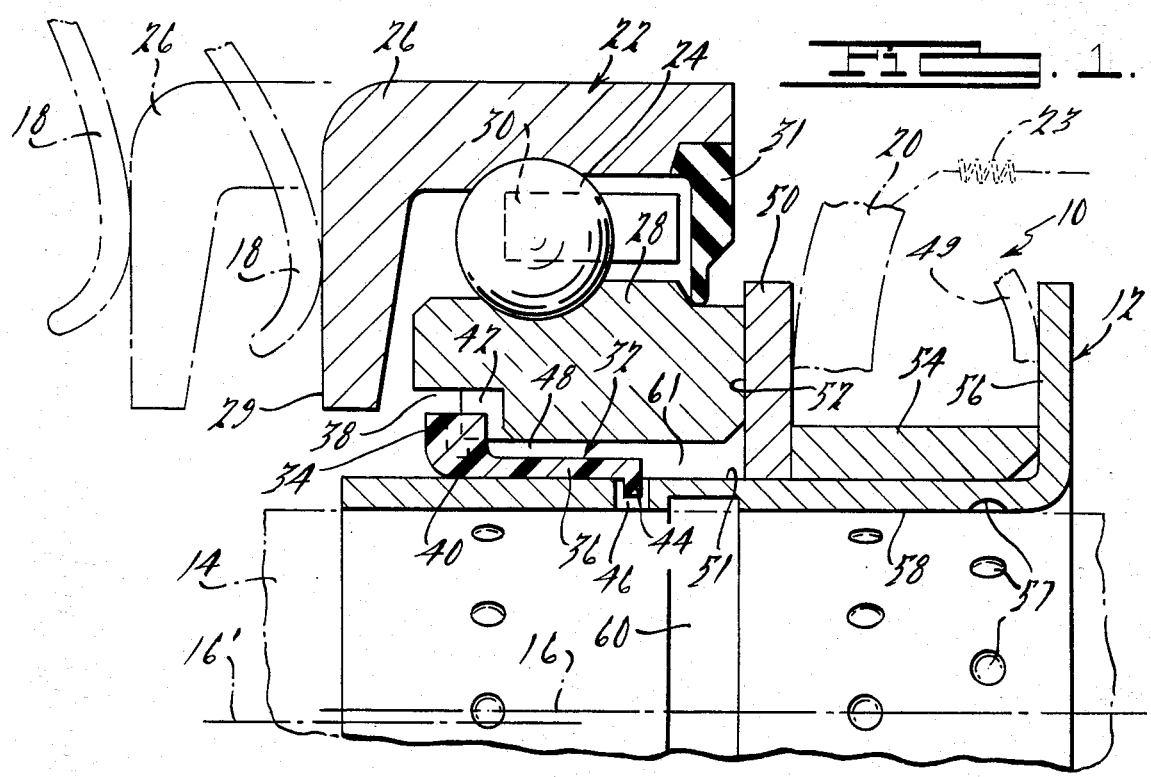
FIG. 1 is a fragmentary cross-sectional view of a self-aligning clutch release bearing assembly according to the present invention shown in a relationship with the clutch engaged and shown partially in phantom with the clutch disengaged.

Referring to FIG. 1, a self-aligning clutch release bearing assembly 10 in accordance with the present invention is shown, and is adapted for use with a conventional clutch assembly, the details of which have been omitted for simplicity. Bearing assembly 10 includes a tubular bearing carrier 12 adapted to be slidably mounted on a guide member or quill 14 shown in phantom. The guide member 14 may typically comprise a tubular support affixed to and projecting forwardly of a transmission (not shown) through which the transmission shaft extends. Under ideal conditions guide member 14 is disposed with its axis 16 substantially coaxial with an input axis of rotation 16' for the clutch assembly. However, often the axis 16 of guide member 14 will be slightly out of alignment or eccentric with respect to the rotational axis 16' such as shown in the drawings. The clutch assembly includes clutch release lever means 18 (partially shown in phantom) which rotates about axis 16'. A clutch actuating fork means 20 (partially shown in phantom) straddles bearing carrier 12 and is actuable to axially move the clutch release bearing assembly 10. A further description of a typical friction disc clutch may be found in assignee's U.S. Pat. No. 4,033,440, issued July 5, 1977, entitled "Self-Aligning Clutch Bearing Assembly," the disclosure of which is hereby incorporated by reference.

As is well understood in the art, actuation of the clutch occurs through pivotal movement of the levers 18 as imparted thereto through the fork 20 via the clutch bearing 10. This actuation will force bearing assembly 10 to slide along bearing carrier 12 from a first position wherein the clutch is in an engaged condition for coupling power from the engine to the transmission, to a second position (shown in phantom) wherein the clutch is in a disengaged position for uncoupling power. With prior designs, it has been common for the release bearing to be engaged with the levers 18 only during clutch actuation. However, the present invention is specifically designed for use with a clutch constructed such that the bearing assembly 10 is continuously engaged by the levers 18. In this clutch design, the actuating fork 20 may typically be spring loaded via a spring 23 (shown in phantom) such as to normally urge the bearing assembly 10 into a continuous light contact with the clutch release levers 18 when the clutch is in the engaged condition. As can be seen, the contact continues when the clutch pedal is depressed to disengage the clutch. This continuous contact with the clutch engaged or disengaged is shown as solid and phantom lines, respectively, in FIG. 1 (see also FIG. 4). As previously noted, without the bias from the fork 20, the bearing assembly 10 would move out of alignment each time the clutch pedal is released and the clutch is in the engaged condition.

Accordingly, the bearing assembly 10 includes a bearing 22 which is adapted to be in constant engagement with clutch release levers 18. Bearing 22 generally comprises a plurality of anti-friction ball elements 24 interposed between an outer race member 26 and an inner race member 28. The bearing 22 is of the type capable of withstanding axial thrust loads imposed thereon. Outer race member 26 is adapted for rotation and includes an annular radially extending contact surface 29 positioned so as to engage the clutch release levers 18. A cage 30 circumferentially spaces balls 24, while a resilient elastomeric annular seal element 31 is secured to outer race member 26.

Bearing 22 is disposed substantially coaxially around bearing carrier 12 between clutch release levers 18 and clutch actuating fork 20. Interposed between bearing 22 and bearing carrier 12 is a retainer sleeve 32 constructed from a suitable resilient material, such as nylon, Delrin ® (a DuPont trademark), or the like. Retainer sleeve 32 operates to both retain bearing 22 in assembled relationship with bearing carrier 12 and to prevent relative rotation of inner race member 28 with respect thereto. As best seen with reference to FIGS. 2 and 3, retainer sleeve 32 includes a generally continuous annular flange 34 which projects radially outwardly from one end of a generally axially extending cylindrical section 36. Cylindrical section 36 preferably has an inner diameter approximately equal to the outer diameter of bearing carrier 12 so as to form a relatively snug close fit therebetween. Flange 34 is adapted to extend into an inwardly facing groove 38 formed in the inner race member 28. Retainer sleeve 32 also includes a tab 40 (see FIGS. 2 and 3) which projects outwardly from section 36 and extends axially from flange 34 along section 36. Tab 40 is adapted to extend into a notch 42 formed in the inner race member 28 which opens into an annular groove 38. Accordingly, tab 40 and notch 42 cooperate or interlock to prevent the rotation of the inner race member 28 with respect to the retainer sleeve 32.

Figure 3:
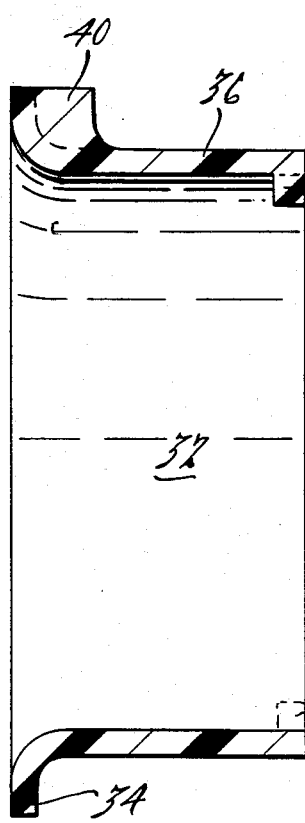
FIG. 3 is an enlarged cross-sectional view of the retainer sleeve shown in FIG. 2, the section being taken along lines 3—3 thereof.
Figure 2:
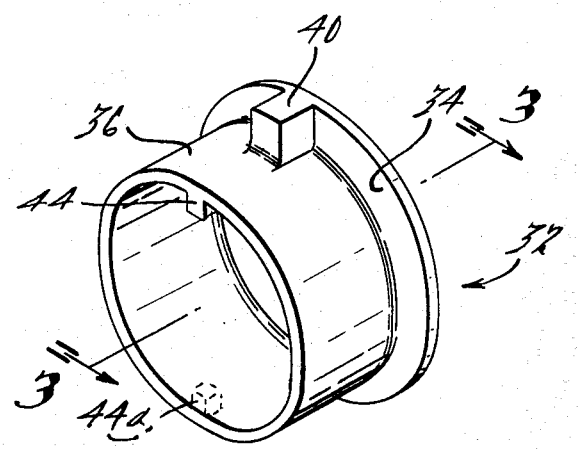
FIG. 2 is a perspective view of the retainer sleeve provided in the bearing assembly of FIG. 1.

Retainer sleeve 32 further includes a tab 44 which projects radially inwardly from section 36. Tab 44 is adapted to extend into an aperture 46 formed in bearing carrier 12. Accordingly, tab 44 and aperture 46 cooperate or interlock to prevent the rotation of the retainer sleeve 32 with respect to the bearing carrier 12. Thus, tab 44 cooperates with flange 34 and tab 40 to both retain bearing 22 in assembled relationship to bearing carrier 12 and to prevent relative rotation between inner race 28 and bearing carrier 12. It should be noted that retainer sleeve 32 should have sufficient resiliency to permit the retainer sleeve to slide over bearing carrier 12 during assembly and allow tab 44 to snap into aperture 46. It should also be noted that the tab 44 may be disposed anywhere around the circumference of retainer sleeve 32 with respect to the tab 40. This is illustrated in FIGS. 2 and 3 by the provision of a tab 44a (shown in phantom) which is positioned so as to be diametrically opposing the tab 40.

As noted above, it is desirable to prevent rotation of the inner race member 28, and for that matter the bearing carrier 12 as well. To this end, the actuating fork 20 while straddling the bearing assembly 10 may have a cantilever spring member 49 which places a bias between the fork 20 and a thrust washer 50 and spring member 49 and flange portion 56 to thereby provide resistance against rotational movement of the bearing carrier 12.

Bearing 22 is formed to provide a predetermined annular radial clearance 48 between the inner race member 28 and section 36 of the retainer sleeve 32. The radial clearance 48 permits bearing 22 to shift sufficiently radially with respect to bearing carrier 12 and axis 16, whereby the bearing may coaxially align itself with the clutch input shaft axis 16' under the dynamic force exerted on the bearing 22 by the clutch release levers 18. After the bearing 22 is coaxially aligned with the input shaft axis 16', the continuous or constant engagement of the clutch release levers 18 with the radially extending contact surface 30 of the rotatable race member 26 will tend to hold the bearing 22 in this desired radial attitude even when the clutch is not being actuated to its disengaged position (the disengaged position being shown in phantom in FIG. 1).

It should be understood that the alignment of the bearing 22 with the clutch input shaft axis 16' is dynamic in character and a number of transient forces may act upon the bearing assembly to cause temporary misalignments. For example, vibration or shock loading may cause the bearing 22 to slip slightly out of alignment. Additionally, misalignment may occur during the translational movement of the bearing assembly 10 along the guidemember 14, such as when the clutch pedal is manually depressed or released. Depending upon how closely the bearing carrier 12 is fitted over the guide member 14, the pivotal movement of the actuating fork 20 during clutch actuation may cause the bearing carrier 12 to move in such a manner as to result in a momentary misalignment between the bearing 22 and the clutch input axis 16'. Nevertheless, the engagement between the rotating clutch release levers 18 and the bearing 22 will provide the force required for the bearing 22 to readily realign itself with the clutch input axis 16'. It should also be noted that the non-metallic character of the resilient retainer sleeve 34 serves to reduce noise which may result from the radial shifting movement of the bearing 22 with respect to the bearing carrier 12.

The thrust washer 50 is coaxially supported with a close fit on an axially extending surface 51 of bearing carrier 12 adjacent to and in engagement with the inner race member 28 of the bearing 22. Thrust washer 50 is used to maintain bearing 22 in a generally vertical attitude with respect to axis 16 and provides a bearing surface 52 against which the inner race member 28 may readily slide when bearing 22 shifts radially to align itself with the clutch input shaft axis 16'. However, it should be understood that this function may alternatively be provided by suitably shaping actuating fork 20. Bearing carrier 12 further includes a tubular collar 54 positioned in a press fit relationship with surface 51 of the bearing carrier 12 between the thrust washer 50 and a radially projecting flange 56 of the bearing carrier 12. Collar 54 serves to axially position bearing 22 and thrust washer 50 along the bearing carrier 12.

Bearing carrier 12 is also formed with a plurality of radially outwardly projecting indentations 57 disposed circumferentially about an interior axially extending bearing carrier surface 58 for providing pockets between the bearing carrier 12 and the guide member or quill 41. The indentations 57 can be filled with a suitable lubricant for lubricating the reciprocable axial movement of the bearing assembly 10 along the guide member 14 during actuation and deactuation of the associated clutch. For the same purpose, bearing carrier 12 is further formed with an annular groove 60 for holding a supply of lubricant.

Referring to FIG. 4, a self-aligning clutch release bearing assembly 62 according to another embodiment of the present invention is shown. For simplicity, those components of bearing assembly 62 which are similar to like components of bearing assembly 10 will be identified with the same reference numerals primed. Bearing assembly 62 includes a split retainer sleeve 63 interposed between a bearing inner race member 64 and a bearing carrier 65.

As best seen with reference to FIGS. 5 and 6, retainer sleeve 63 includes a first plurality of circumferentially extending spaced flanges 66 which project radially outwardly from one end of an axially extending cylindrical straight section 68. First flanges 66 are adapted to be located within a first annular groove 70 formed at one end in the inner race member 64. A tab 72 projects axially inwardly from one of the first flanges 66 and is adapted to extend into a notch 74 formed in the annular groove 70 of inner race member 64. Tab 72 and the notch 74 cooperate to prevent relative rotation between inner race 64 and bearing carrier 65 in the same manner as described for tab 40 and notch 42 of bearing assembly 10.

Retainer sleeve 63 also includes a second plurality of circumferentially extending spaced flanges 76 which project radially outwardly from the opposite end of section 68. As may be more clearly seen with reference to FIG. 5, it is preferred that second flanges 76 be disposed around the circumference of retainer sleeve 63 such that they are circumferentially offset from flanges 66. The spaced flange structure of flanges 66 and 76 are provided in lieu of solid continuous, one piece flanges to save weight and material and hence, cost. Flanges 76 are adapted to be located in a second annular groove 78 formed at the opposite side of inner race member 64 to cooperate with flanges 66 to retain bearing 22 in an assembled relationship with retainer sleeve 63. Retainer sleeve 63 also includes a tab 80 which projects axially outwardly from one of the flanges 76. Tab 80 is adapted to be located in an aperture 82 formed in a thrust washer 84, and cooperates or interlocks therewith to prevent the rotation of retainer sleeve 63 with respect to thrust washer 84.

As in the case of the previous embodiment, the tab 80 may be disposed anywhere around the circumference of retainer sleeve 32 with respect to the tab 72. This is illustrated in FIGS. 5 and 6 by the provision of a tab 80a (shown in phantom) which is positioned so as to be diametrically opposing the tab 72.

Retainer sleeve 63 additionally includes an annular radially inwardly projecting rib 86 disposed intermediate the ends of section 68. Rib 86 is adapted to be located within an outwardly facing complementarily shaped groove 88 formed in bearing carrier 65. The rib 86 and the groove 88 cooperate or interlock to prevent retainer sleeve 63 from separating or slipping off bearing carrier 65 and thereby maintains bearing 22 in assembled relationship on carrier 65.

As illustrated in FIG. 5, retainer sleeve 63 is of a split ring construction via opening 90. Thus, the diameter of sleeve 63 may be reduced or expanded slightly in order to facilitate assembly with bearing 22' and carrier 65. Preferably, the diameter of sleeve 63 will be first reduced to allow it to be inserted through the opening in bearing inner race 64. As in the case of the first embodiment, inner race 64 has a diameter designed to provide an annular radial clearance 92 whereby bearing 22' may float relative to sleeve 63. Accordingly, the diameter of sleeve 63 may be expanded slightly so as to allow rib 86 to slip over bearing carrier 65 and snap into position in groove 88. The inside diameter of sleeve 63 will preferably be such relative to carrier 65 as to form a relatively snug close fit therewith. It should be noted that grooves 70 and 78 are preferably sized to provide a radial clearance with regard to flanges 66 and 76 respectively, approximately equal to radial clearance 92.

The various embodiments which have been set forth above are for the purpose of illustration and are not intended to limit the invention. It will be appreciated by those skilled in the art that various changes and modifications may be made to these embodiments described in this specification without departing from the spirit and scope of the invention as defined by the appended claims.

What is claimed is:

1. An improved self-aligning clutch release bearing assembly for a friction clutch in a vehicle power train having release lever means rotatable about an input shaft axis of said clutch, a guide member disposed generally coaxially around a transmission shaft axis of said power train and actuating fork means, said bearing assembly comprising:
    a tubular bearing carrier slidably mounted on said guide member for reciprocable, translational movement therealong in response to actuation of said actuating fork means;
    a bearing including a plurality of anti-friction elements interposed between radially spaced inner and outer race members, one of said race members being adapted for rotation and having an annular radially extending bearing surface for engaging said clutch release lever means;

said bearing being disposed substantially coaxially around said bearing carrier between said release lever means and said actuating fork means and formed to allow for a predetermined radial clearance for said bearing for permitting said bearing to shift radially with respect to said bearing carrier, so that said bearing may coaxially align itself with said clutch input axis under a dynamic force exerted on said bearing by said release lever means;

a resilient retainer sleeve having an axially-extending portion thereof interposed radially between the other of said bearing race members and said bearing carrier; confronting surfaces of said bearing and said retainer sleeve being formed to define said predetermined radial clearance between said bearing and said retainer sleeve;

radial projecting means for mechanically interlocking said retainer sleeve and said other race member of said bearing in an axially interfering relationship with one another in order to substantially retain said bearing in assembled relationship with said bearing carrier;

first cooperating means for mechanically interlocking said retainer sleeve and said other of said bearing race member in a circumferentially interfering relationship with one another in order to substantially prevent relative rotation between said retainer sleeve and said other race member of said bearing; and second cooperating means for mechanically interlocking said retainer sleeve and said bearing carrier in a circumferentially interfering relationship with one another in order to substantially prevent relative rotation between said retainer sleeve and said bearing carrier.

2. The self-aligning clutch release bearing assembly according to claim 1 wherein said radial projection means includes at least one flange member extending radially outwardly from said retainer sleeve and engageable with said bearing for mechanically interlocking said bearing in assembled relationship with said bearing carrier.

3. The self-aligning clutch release bearing assembly according to claim 2, wherein said flange member is adapted to extend into a first annular, axially spaced groove formed in said other race member.

4. The self-aligning clutch release bearing assembly according to claim 3, wherein said first cooperating means includes a first tab on said flange extending into a notch formed in said first annular groove of said other race member for preventing rotation of said other race member with respect to said retainer sleeve.

5. The self-aligning clutch release bearing assembly according to claim 4, wherein said second cooperating means includes a radially inwardly projecting tab extending radially into an opening formed in said bearing carrier and cooperating therewith for retaining said retainer sleeve in assembled relationship with said bearing carrier.

6. The self-aligning clutch release bearing assembly according to claim 5, wherein said radially inwardly projecting tab and said opening in said bearing carrier are formed to prevent relative rotation between said retainer sleeve and said bearing carrier.

7. An improved self-aligning clutch release bearing assembly for a friction clutch in a vehicle power train having release lever means rotatable about an input shaft axis of said clutch, a guide member disposed generally coaxially around a transmission shaft axis of said power train and actuating fork means, said bearing assembly comprising:

a tubular bearing carrier slidably mounted on said guide member for reciprocable, translational movement therealong in response to actuation of said actuating fork means;

a bearing including a plurality of anti-friction elements interposed between radially spaced inner and outer race members, one of said race members being adapted for rotation and having an annular radially extending bearing surface for engaging said clutch release lever means;

said bearing being disposed substantially coaxially around said bearing carrier between said release lever means and said actuating fork means and formed to allow for a predetermined radial clearance for said bearing for permitting said bearing to shift radially with respect to said bearing carrier, so that said bearing may coaxially align itself with said clutch input axis under a dynamic force exerted on said bearing by said release lever means;

a resilient retainer sleeve interposed between said bearing and said bearing carrier for mechanically interlocking said bearing to and in an assembled relationship with said bearing carrier;

confronting surfaces of said bearing and said retainer sleeve being formed to define said predetermined radial clearance between said bearing and said retainer sleeve;

said retainer sleeve including projecting means engageable with said bearing for mechanically interlocking said bearing in assembled relationship with said bearing carrier, said projecting means including a pair of axially spaced, radially extending flanges adapted to extend into a pair of axially spaced, annular grooves formed in the other of said race members for retaining said bearing in an assembled relationship with said retaining sleeve; and cooperating means for substantially preventing relative rotation between said retainer sleeve and said other race member of said bearing.

8. The self-aligning clutch release bearing assembly according to claim 7, wherein said projecting means also includes a first tab extending from one of said flanges and into a notch formed in the associated one of said grooves and cooperating therewith to prevent the rotation of said other race member with respect to said retainer sleeve.

9. The self-aligning clutch release bearing assembly according to claim 8, wherein said retainer sleeve further includes a second tab extending from the other of said flanges into an aperture fixed from rotation relative to said bearing carrier whereby rotation of said retainer sleeve with respect to said bearing carrier is precluded.

10. The self-aligning clutch release bearing assembly according to claim 9, wherein said retainer sleeve additionally includes an inwardly projecting rib extending into a groove formed in said bearing carrier and cooperating therewith to retain said retainer sleeve in assembled relationship with said bearing carrier.

* * * * *